US012646448B2

(12) United States Patent
Lee

(10) Patent No.: US 12,646,448 B2
(45) Date of Patent: Jun. 2, 2026

(54) DISPLAY DEVICE AND METHOD OF DRIVING THE SAME

(71) Applicant: Samsung Display Co., LTD., Yongin-si (KR)

(72) Inventor: Kyung-Hun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/970,485

(22) Filed: Dec. 5, 2024

(65) Prior Publication Data

US 2025/0225918 A1 Jul. 10, 2025

(30) Foreign Application Priority Data

Jan. 10, 2024 (KR) ........................ 10-2024-0004056

(51) Int. Cl.
*G09G 3/32* (2016.01)

(52) U.S. Cl.
CPC ......... *G09G 3/32* (2013.01); *G09G 2320/048* (2013.01); *G09G 2320/0626* (2013.01); *G09G 2330/021* (2013.01); *G09G 2360/16* (2013.01)

(58) Field of Classification Search
None
See application file for complete search history.

(56) References Cited

U.S. PATENT DOCUMENTS 12,008,951 B2 6/2024 Lee
2018/0020525 A1* 1/2018 Moon ........................ H01J 1/62
2019/0164503 A1* 5/2019 An ........................ G09G 3/3291

* cited by examiner

*Primary Examiner* — Aneeta Yodichkas
(74) *Attorney, Agent, or Firm* — Womble Bond Dickinson (US) LLP

(57) ABSTRACT

A display device includes a display panel including pixels, a power management circuit configured to provide a voltage to the display panel through a power voltage line, and configured to decrease the voltage when a power current of the display panel flowing through the power voltage line is greater than a reference current, and a controller configured to control the power management circuit, and including a panel degradation calculator configured to calculate a panel degradation amount of the display panel, a maximum power current calculator configured to calculate a maximum power current of the display panel based on the panel degradation amount, and a reference current calculator configured to calculate the reference current by multiplying the maximum power current by a gain.

20 Claims, 11 Drawing Sheets

DISPLAY DEVICE AND METHOD OF DRIVING THE SAME

CROSS-REFERENCE TO RELATED APPLICATION

The present application claims priority to, and the benefit of, Korean Patent Application No. 10-2024-0004056, filed on Jan. 10, 2024, in the Korean Intellectual Property Office, the entire disclosure of which is incorporated herein by reference.

BACKGROUND

1. Field

Embodiments relate to a display device for reducing or preventing damage due to overcurrent, and a method of driving the display device.

2. Description of the Related Art

A display device may include a display panel and a panel driver. The display panel may include a plurality of pixels. The panel driver may include a data driver and a power management circuit. The data driver may provide data voltages to the pixels. The power management circuit may provide a high power voltage to the pixels through a power voltage line.

The display device may detect a current flowing through the display panel by measuring a power current flowing through the power voltage line. When the power current is greater than a reference current (e.g., predetermined reference current), the power management circuit may decrease the high power voltage to reduce or prevent an overcurrent flowing through the display panel.

As a driving time of the display panel increases, the pixels may be degraded, and driving currents flowing through light-emitting elements included in the pixels may decrease. To compensate for the degradation of the display panel, the data voltages provided to the pixels may increase, and accordingly, the driving currents flowing through the light-emitting elements included in the pixels may increase.

SUMMARY

Embodiments provide a display device for controlling a high power voltage in consideration of an increase of a power current by a degradation compensation of a display panel and a method of driving the display device.

Embodiments provide a display device for reducing power consumption, and a method of driving the display device.

A display device according to embodiments may include a display panel including a display panel including pixels, a power management circuit configured to provide a voltage to the display panel through a power voltage line, and configured to decrease the voltage when a power current of the display panel flowing through the power voltage line is greater than a reference current, and a controller configured to control the power management circuit, and including a panel degradation calculator configured to calculate a panel degradation amount of the display panel, a maximum power current calculator configured to calculate a maximum power current of the display panel based on the panel degradation amount, and a reference current calculator configured to calculate the reference current by multiplying the maximum power current by a gain.

The panel degradation calculator may include a block stress accumulator configured to calculate ages of blocks including at least one pixel among the pixels by accumulating stresses of the blocks, and a block degradation calculator configured to calculate block degradation amounts of the blocks based on the ages of the blocks.

The panel degradation amount may be equal to a maximum block degradation amount among the block degradation amounts.

The controller may further include a degradation compensator configured to convert input image data into output image data based on the block degradation amounts.

The controller may further include a sensing circuit configured to measure sensing values for the pixels, wherein the panel degradation calculator includes a pixel degradation calculator configured to calculate pixel degradation amounts of the pixels based on the sensing values.

The panel degradation amount may be equal to a maximum pixel degradation amount among the pixel degradation amounts.

The controller may further include a degradation compensator which configured to convert input image data into output image data based on the pixel degradation amounts.

The gain may be configured to remain constant regardless of a driving time of the display panel.

The gain may be configured to decrease as a driving time of the display panel increases.

The gain may be greater than 1.

The power current may be a sum of driving currents flowing through light-emitting elements of the pixels.

The maximum power current may correspond to a maximum luminance of an image displayed by the display panel.

A method of driving a display device according to embodiments may include calculating a panel degradation amount of a display panel including pixels, calculating a maximum power current of the display panel based on the panel degradation amount, calculating a reference current by multiplying the maximum power current by a gain, and decreasing a voltage of the display panel when a power current of the display panel is greater than the reference current.

Calculating the panel degradation amount may include calculating ages of blocks each including at least one pixel among the pixels by accumulating stresses of the blocks, and calculating block degradation amounts of the blocks based on the ages of the blocks.

The panel degradation amount may be equal to a maximum block degradation amount among the block degradation amounts.

Calculating the panel degradation amount may include measuring sensing values for the pixels, and calculating pixel degradation amounts of the pixels based on the sensing values.

The panel degradation amount may be equal to a maximum pixel degradation amount among the pixel degradation amounts.

The method may further include maintaining the gain as constant regardless of a driving time of the display panel.

The method may further include decreasing the gain as a driving time of the display panel increases.

The gain may be greater than 1.

In the display device and the method of driving the display device according to the embodiments, the reference current may be calculated by multiplying the maximum power current calculated based on the panel degradation amount of the display panel by the gain, and the high power voltage of the display panel may decrease when the power current of the display panel is greater than the reference current, so that the high power voltage may be controlled in consideration of a degradation compensation of the display panel, and frequent decrease of the high power voltage may be reduced or prevented. Further, the gain may decrease as the driving time of the display panel increases, so that power consumption increase of the display device may be reduced or prevented.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
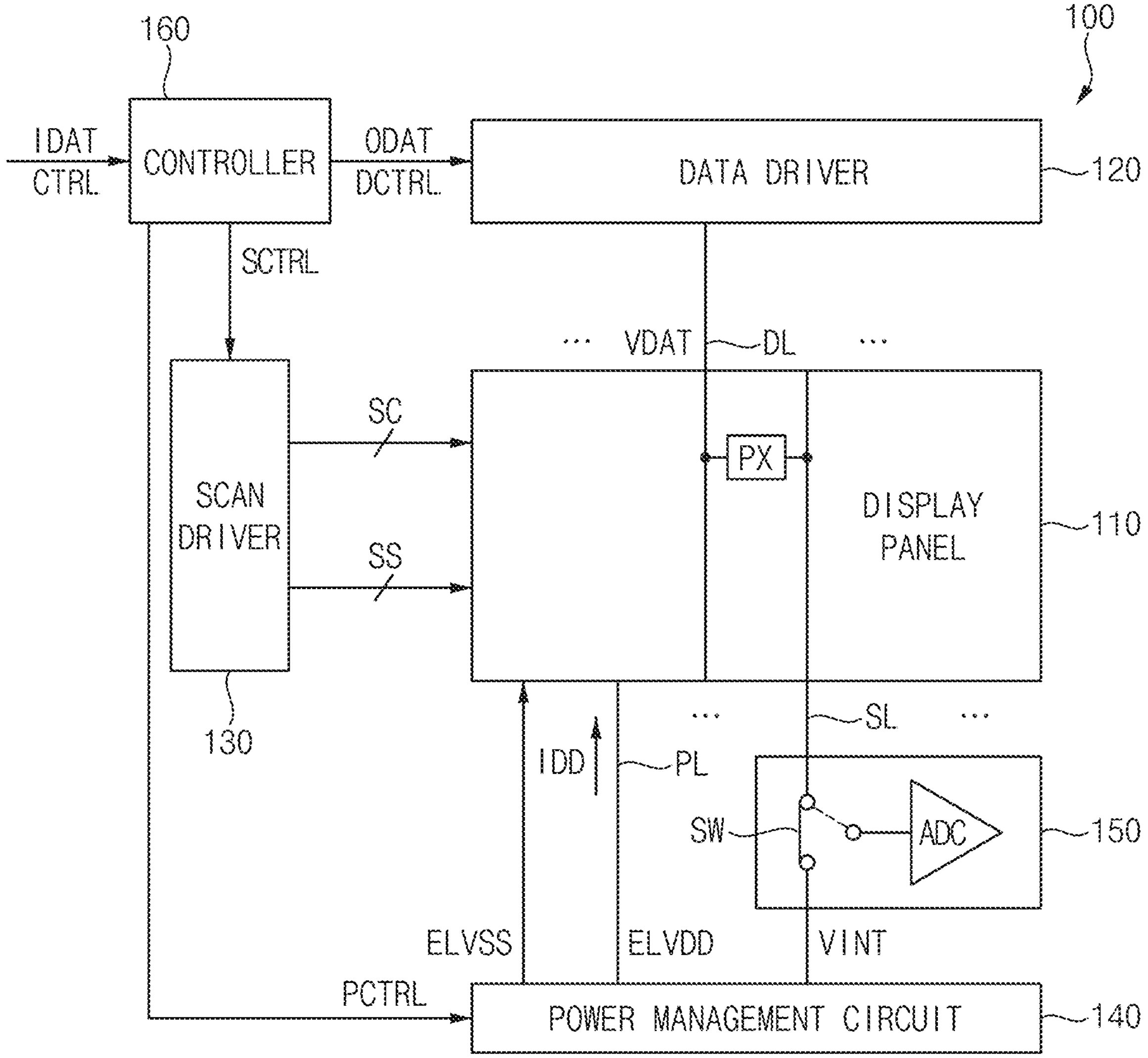
FIG. 1 is a block diagram showing a display device according to one or more embodiments.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that the present disclosure covers all modifications, equivalents, and replacements within the idea and technical scope of the present disclosure, that each of the features of embodiments of the present disclosure may be combined with each other, in part or in whole, and technically various interlocking and operating are possible, and that each embodiment may be implemented independently of each other, or may be implemented together in an association, unless otherwise stated or implied.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, a display device and a method of driving a display device according to embodiments of the present disclosure will be described in more detail with reference to the accompanying drawings.

Figure 2:
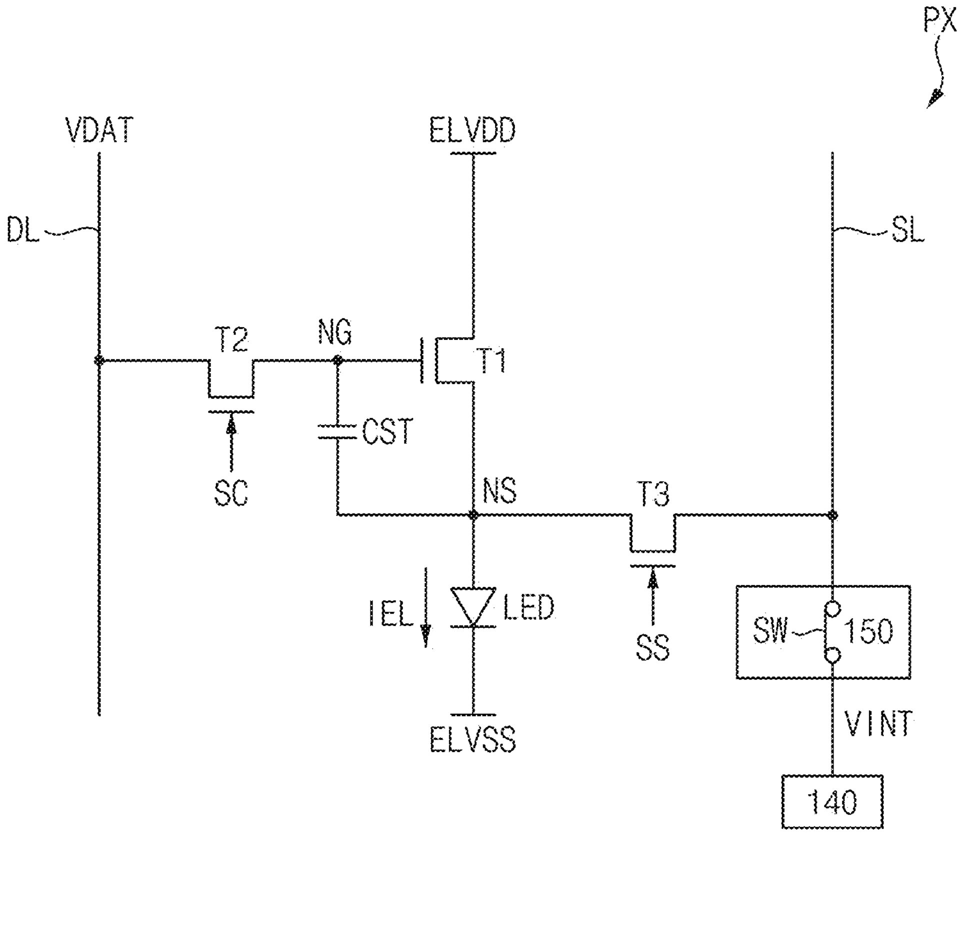
FIG. 2 is a circuit diagram showing an example of a pixel included in the display device of FIG. 1.
Figure 3:
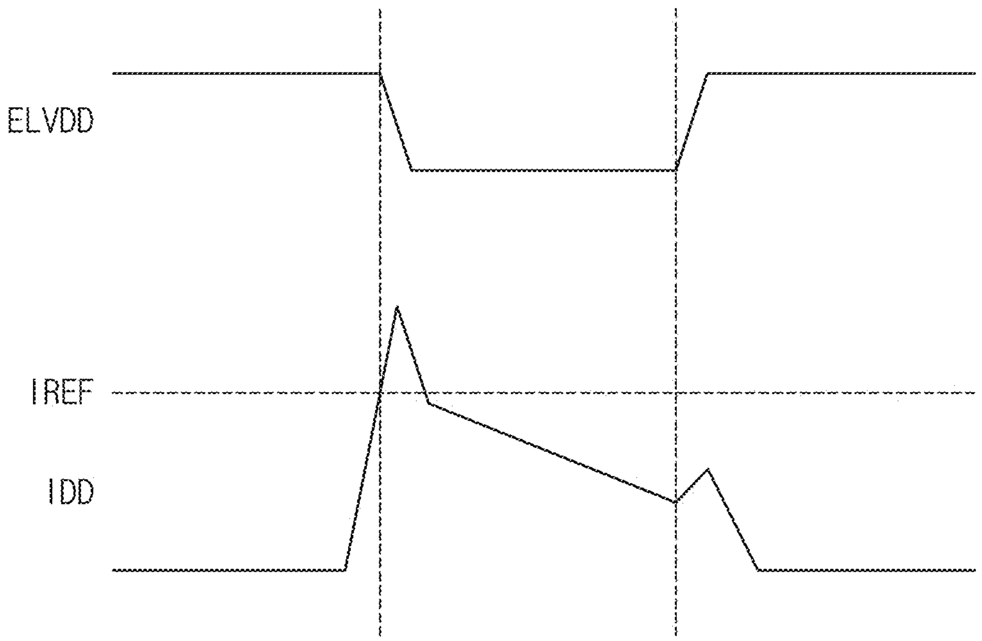
FIG. 3 is a view for describing a control of a high power voltage according to an increase and a decrease of a power current.
Figure 4:
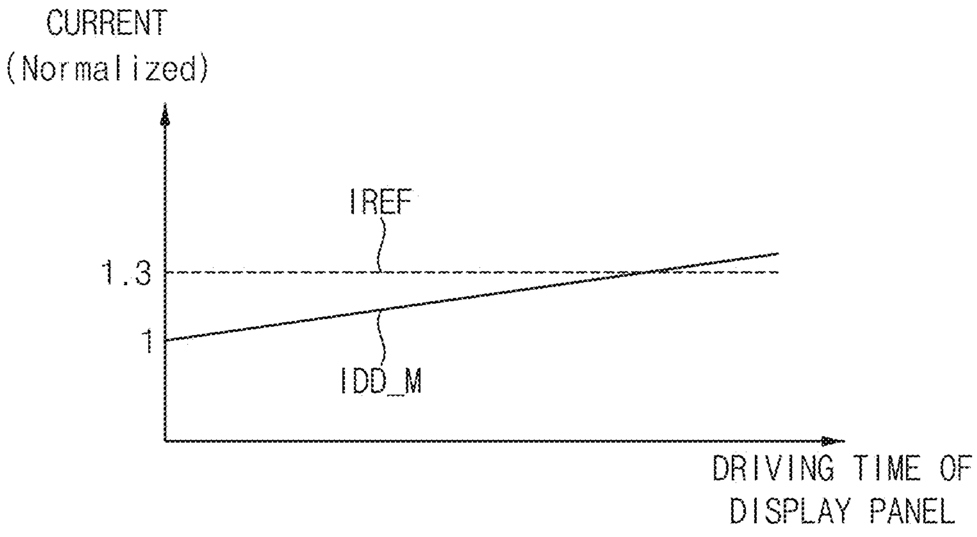
FIG. 4 is a view for describing a reference current according to a comparative example.

FIG. 1 is a block diagram showing a display device 100 according to one or more embodiments. FIG. 2 is a circuit diagram showing an example of a pixel PX included in the display device 100 of FIG. 1. FIG. 3 is a view for describing a control of a high power voltage ELVDD according to an increase and a decrease of a power current IDD. FIG. 4 is a view for describing a reference current IREF according to a comparative example.

Referring to FIG. 1, a display device 100 may include a display panel 110, a data driver 120, a scan driver 130, a power management circuit 140, and a controller 160. In one or more embodiments, the display device 100 may further include a sensing circuit 150.

The display panel 110 may include a plurality of pixels PX, a plurality of data lines DL, a plurality of first scan lines, a plurality of second scan lines, and a plurality of sensing lines SL. The pixels PX may be connected to the data lines DL, the first scan lines, the second scan lines, and the sensing lines SL. In one or more embodiments, each of the pixels PX may include a light-emitting element, and the display panel 110 may be a light-emitting display panel.

In one or more embodiments, as shown in FIG. 2, each of the pixels PX may include a first transistor T1, a second transistor T2, a third transistor T3, a capacitor CST, and a light-emitting element LED.

The capacitor CST may store a data voltage VDAT transmitted by the second transistor T2 from the data line DL. The capacitor CST may be referred to as a storage capacitor for storing the data voltage VDAT, but the present disclosure is not limited thereto. In one or more embodiments, the capacitor CST may include a first electrode connected to a first node NG and a second electrode connected to a second node NS.

The first transistor T1 may generate a driving current IEL based on the data voltage VDAT stored in the capacitor CST. The first transistor T1 may be referred to as a driving transistor for generating the driving current IEL, but the present disclosure is not limited thereto. In one or more embodiments, the first transistor T1 may include a gate connected to the first node NG, a drain for receiving a high power voltage ELVDD, and a source connected to the second node NS.

The second transistor T2 may transmit the data voltage VDAT to the first node NG in response to a first scan signal SC. The second transistor T2 may be referred to as a scan transistor, but the present disclosure is not limited thereto. In one or more embodiments, the second transistor T2 may include a gate for receiving the first scan signal SC, a drain connected to the data line DL, and a source connected to the first node NG.

The third transistor T3 may connect the sensing line SL to the second node NS in response to a second scan signal SS. While a switch SW of the sensing circuit 150 connects the sensing line SL to the power management circuit 140, the power management circuit 140 may apply an initialization voltage VINT to the sensing line SL, and the third transistor T3 may transmit the initialization voltage VINT of the sensing line SL to the second node NS in response to the second scan signal SS. Further, while the switch SW of the sensing circuit 150 connects the sensing line SL to an analog-to-digital converter ADC of the sensing circuit 150, the third transistor T3 may connect the sensing line SL to the second node NS in response to the second scan signal SS, and the sensing circuit 150 may sense characteristics of the pixel PX through the sensing line SL. In one or more embodiments, the third transistor T3 may include a gate for receiving the second scan signal SS, a drain connected to the second node NS, and a source connected to the sensing line SL.

In one or more embodiments, each of the first transistor T1, the second transistor T2, and the third transistor T3 may be implemented as an N-type transistor (e.g., NMOS transistor), but the present disclosure is not limited thereto. In one or more other embodiments, at least one of the first transistor T1, the second transistor T2, and the third transistor T3 may be implemented as a P-type transistor (e.g., PMOS transistor). In one or more embodiments, each of the first transistor T1, the second transistor T2, and the third transistor T3 may be implemented as an oxide semiconductor transistor, but the present disclosure is not limited thereto. In one or more other embodiments, at least one of the first transistor T1, the second transistor T2, and the third transistor T3 may be implemented as a polycrystalline silicon transistor.

In one or more embodiments, the pixel PX may include three transistors and one capacitor, but the present disclosure is not limited thereto. In one or more other embodiments, the pixel PX may include 2 or 4 transistors and/or 2 or more capacitors.

The light-emitting element LED may emit light in response to the driving current IEL flowing from a line transmitting the high power voltage ELVDD to a line transmitting a low power voltage ELVSS. In one or more embodiments, the light-emitting element LED may include an anode connected to the second node NS, and a cathode for receiving the low power voltage ELVSS. In one or more embodiments, the light-emitting element LED may be an organic light-emitting diode (OLED). In one or more other embodiments, the light-emitting element LED may be a nano light-emitting diode (NED), a quantum dot (QD) light-emitting diode, a micro light-emitting diode, an inorganic light-emitting diode, or the like.

The data driver 120 may generate the data voltages VDAT based on a data control signal DCTRL, and may output image data ODAT received from the controller 160, and may provide the data voltages VDAT to the pixels PX through the data lines DL. In one or more embodiments, the data control signal DCTRL may include an output data enable signal, a horizontal start signal, a load signal, etc. In one or more embodiments, the output image data ODAT may include grayscale values corresponding to the pixels PX.

The scan driver 130 may generate the first and second scan signals SC and SS based on a scan control signal SCTRL received from the controller 160, and may sequentially provide the first and second scan signals SC and SS to the pixels PX through first and second scan lines on a row-by-row basis. In one or more embodiments, the scan control signal SCTRL may include a first scan start signal and a first scan clock signal for generating the first scan signals SC, and also may include a second scan start signal and a second scan clock signal for generating the second scan signals SS. In one or more embodiments, the first scan signal SC may be referred as a scan signal, and the second scan signal SS may be referred as a sensing signal.

The power management circuit 140 may generate the initialization voltage VINT, the high power voltage ELVDD, and the low power voltage ELVSS based on a power management signal PCTRL received from the controller 160, and may provide the initialization voltage VINT, the high power voltage ELVDD, and the low power voltage ELVSS to the display panel 110. The power management circuit 140 may provide the high power voltage ELVDD to the display panel 110 through a power voltage line PL. A power current IDD may flow through the power voltage line PL, and the power current IDD may be the sum of the driving currents IEL flowing through the light-emitting elements LED of the pixels PX included in the display panel 110.

The sensing circuit 150 may sense the characteristics of the pixels PX through the sensing lines SL. In one or more embodiments, the sensing circuit 150 may include the switch SW, which selectively connects the sensing line SL to the power management circuit 140 or the analog-to-digital converter ADC, and also may include the analog-to-digital converter ADC, which converts an analog signal (a sensing voltage or a sensing current) into a digital signal (a sensing value). The switch SW may connect the sensing line SL to the power management circuit 140 while a sensing operation is not performed, and may connect the sensing line SL to the analog-to-digital converter ADC while the sensing operation is performed. The analog-to-digital converter ADC may convert the sensing voltage or the sensing current received from the pixel PX through the sensing line SL into the sensing value, and the sensing circuit 150 may provide the sensing value representing the characteristics of the pixel PX to the controller 160.

The controller 160 (e.g., a timing controller (TCON)) may control the data driver 120, the scan driver 130, and the power management circuit 140. The controller 160 may be provided with input image data IDAT and a control signal CTRL from a host processor (e.g., a graphics processing unit (GPU), an application processor (AP), or a graphics card). In one or more embodiments, the control signal CTRL may include a vertical synchronization signal, a horizontal synchronization signal, a master clock signal, etc. In one or more embodiments, the input image data IDAT may include grayscale values corresponding to the pixels PX. The controller 160 may generate the output image data ODAT, the data control signal DCTRL, the scan control signal SCTRL, and the power management signal PCTRL based on the input image data IDAT and the control signal CTRL. The controller 160 may control an operation of the data driver 120 by providing the output image data ODAT and the data control signal DCTRL to the data driver 120, may control an operation of the scan driver 130 by providing the scan control signal SCTRL to the scan driver 130, and may control an operation of the power management circuit 140 by providing the power management signal PCTRL to the power management circuit 140.

The controller 160 may convert the input image data IDAT into the output image data ODAT to compensate for degradation of the pixels PX (or to compensate for a degradation of the display panel 110). As the driving time of the pixels PX increases, the light-emitting elements LED included in the pixels PX may be degraded. As the light-emitting elements LED is degraded, the driving currents IEL flowing through the light-emitting elements LED may decrease, so that luminance of the pixels PX (or a luminance of the display panel 110) may decrease. Accordingly, the controller 160 may convert the input image data IDAT into the output image data ODAT based on degradation amounts of the pixels PX (or a degradation amount of the display panel 110) that may be calculated based on ages of the pixels PX or the sensing values of the pixels PX. Accordingly, the driving currents IEL flowing through the light-emitting elements LED included in the pixels PX (or the power current IDD flowing through the display panel 110) may increase, such that unwanted decrease of the luminance of the pixels PX (or the luminance of the display panel 110) may be reduced or prevented.

In one or more embodiments, as shown in FIG. 3, when the power current IDD increases above a reference current IREF, the power management circuit 140 may perform an operation that decreases the power current IDD by decreasing the high power voltage ELVDD (hereinafter referred to as a high power voltage ELVDD reduction operation). When the power current IDD increases above the reference current IREF, an overcurrent may occur in the display panel 110, and damage, such as burn-in, may occur in the display panel 110 due to the overcurrent. When the high power voltage ELVDD decreases, the driving currents IEL flowing through the light-emitting elements LED may decrease, and the power current IDD, which is the sum of the driving currents IEL, may decrease. Accordingly, the high power voltage ELVDD reduction operation may be performed when the power current IDD increases above the reference current IREF, so that the overcurrent in the display panel 110 may be reduced or prevented.

The power management circuit 140 may increase the high power voltage ELVDD to an original value that occurred before the high power voltage ELVDD decreased when the power current IDD decreases below the reference current IREF for a certain period of time. Although the high power voltage ELVDD increases to the original value, when a cause of the increase in the power current IDD disappears, the power current IDD may decrease to an original value before the power current IDD increases.

In a comparative example according to the prior art, as shown in FIG. 4, the reference current IREF may be determined based on a maximum power current IDD_M of the display panel 110 at an initial driving time of the display panel 110. For example, the reference current IREF may be determined as a value obtained by multiplying the maximum power current IDD_M of the display panel 110 at the initial driving time of the display panel 110 by a constant value (e.g., 1.3). The maximum power current IDD_M of the display panel 110 may be a power current IDD corresponding to a maximum luminance of an image displayed by the display panel 110. In one or more embodiments, when the display panel 110 displays an image in which a white box is located on a black background, the maximum power current IDD_M may flow through the power voltage line PL. In one or more other embodiments, when the display panel 110 displays a full white image, the maximum power current IDD_M may flow through the power voltage line PL. In the comparative example according to the prior art, the reference current IREF may be determined based on the maximum power current IDD_M of the display panel 110 at the initial driving time of the display panel 110, so that the reference current IREF may be constant regardless of the driving time of the display panel 110.

As described above, the controller 160 may convert the input image data IDAT into the output image data ODAT to compensate for the degradation of the pixels PX, accordingly, the driving currents IEL flowing through the light-emitting elements LED included in the pixels PX may increase as the driving time of the display panel 110 increases, and the power current IDD of the display panel 110, which is the sum of the driving currents IEL, may increase. Accordingly, as the driving time of the display panel 110 increases, the power current IDD (or the maximum power current IDD_M) of the display panel 110 may increase.

When the maximum power current IDD_M of the display panel 110 becomes greater than the reference current IREF as the driving time of the display panel 110 increases, cases may frequently occur in which the power current IDD of the display panel 110 is greater than the reference current IREF, although no overcurrent flows in the display panel 110. When the power current IDD of the display panel 110 is greater than the reference current IREF, the power management circuit 140 may determine that the overcurrent is flowing in the display panel 110, and may perform the high power voltage ELVDD reduction operation. Accordingly, although no overcurrent flows in the display panel 110, the power current IDD of the display panel 110 may decrease, which may decrease the luminance of the display panel 110, and a display quality of the display panel 110 may decrease. In other words, in the comparative example according to the prior art, because the reference current IREF at the initial driving time of the display panel 110 is maintained constant without considering the increase in the power current IDD for compensating for the degradation of the pixels PX (or for compensating for the degradation of the display panel 110), although no overcurrent flows in the display panel 110, the high power voltage ELVDD reduction operations may be frequently performed as the driving time of the display panel 110 increases.

Figure 5:
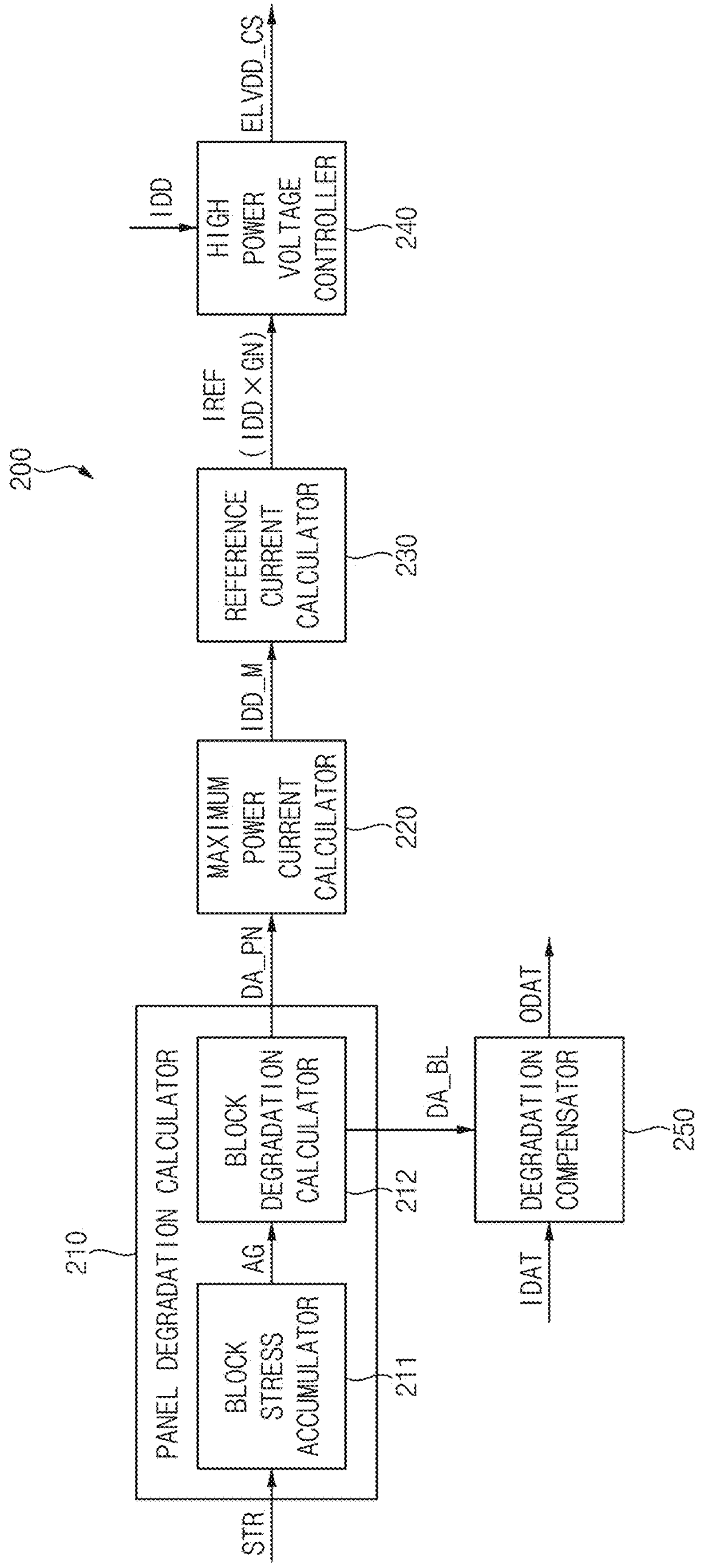
FIG. 5 is a block diagram showing an example of a controller included in the display device of FIG. 1.
Figure 6:
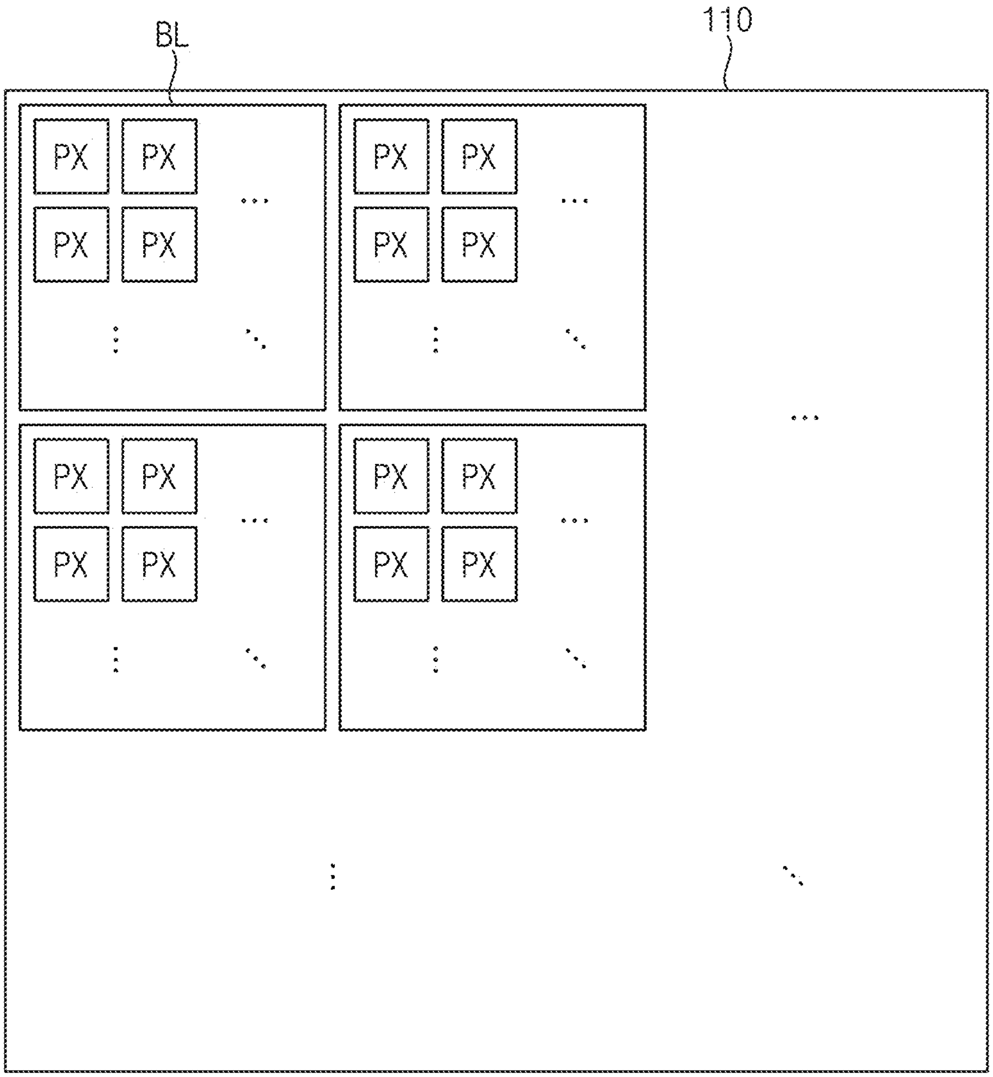
FIG. 6 is a view showing an example of a display panel included in the display device of FIG. 1.
Figure 7:
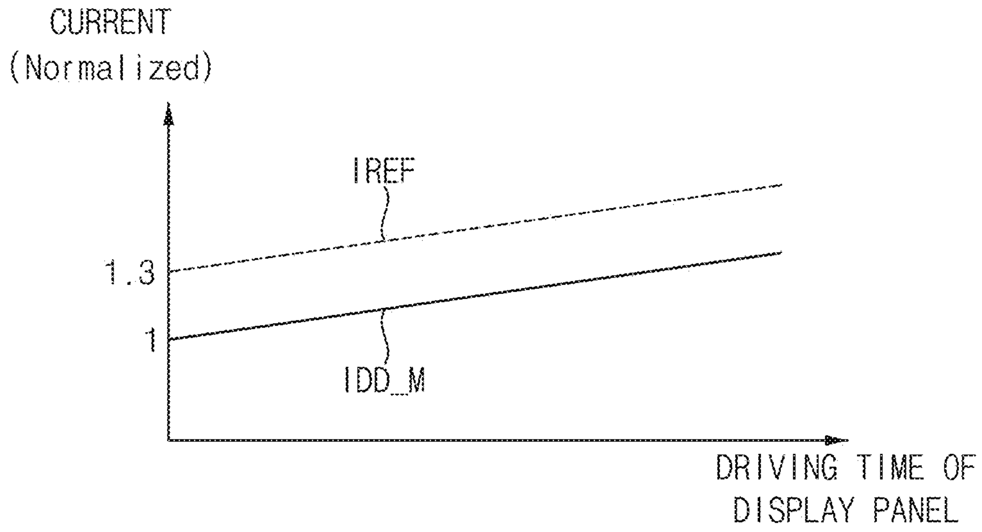
FIG. 7 is a view showing a reference current according to one or more embodiments.
Figure 8:
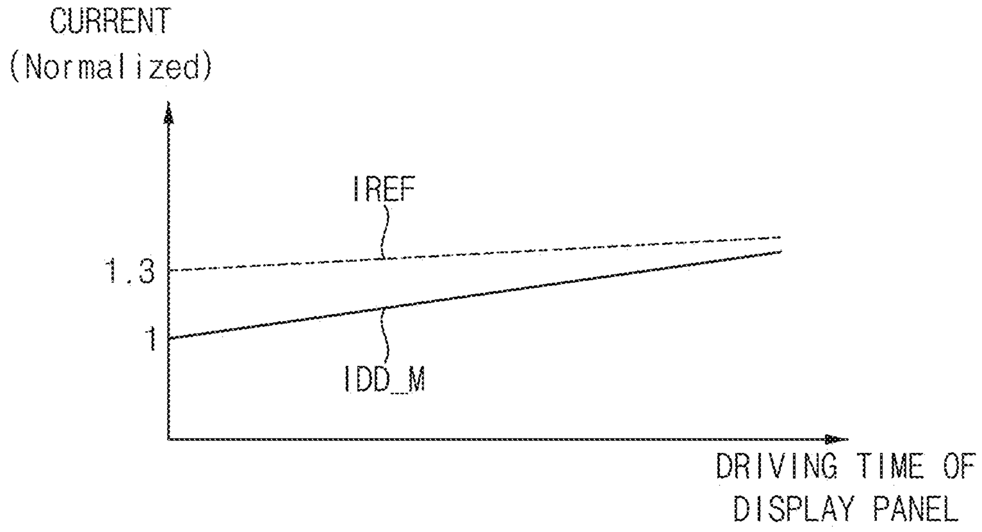
FIG. 8 is a view showing a reference current according to one or more embodiments.

FIG. 5 is a block diagram showing an example of a controller 200 included in the display device 100 of FIG. 1. The controller 200 of FIG. 5 may correspond to the controller 160 of FIG. 1. FIG. 6 is a view showing an example of the display panel 110 included in the display device 100 of FIG. 1. FIG. 7 is a view showing the reference current IREF according to one or more embodiments. FIG. 8 is a view showing the reference current IREF according to one or more embodiments.

Referring to FIGS. 1 and 5, the controller 200 may include a panel degradation calculator 210, a maximum power current calculator 220, a reference current calculator 230, a high power voltage controller 240, and a degradation compensator 250.

The panel degradation calculator 210 may calculate a panel degradation amount DA_PN of the display panel 110. The panel degradation amount DA_PN may indicate a degree of the degradation of the display panel 110. In one or more embodiments, the panel degradation calculator 210 may include a block stress accumulator 211 and a block degradation calculator 212.

The block stress accumulator 211 may calculate ages AG of blocks BL by accumulating stresses STR of the blocks BL. As shown in FIG. 6, the display panel 110 may include a plurality of blocks BL that divide the display panel 110, and each of the blocks BL may include at least one pixel PX. In one or more embodiments, the stress STR of the block BL may correspond to the sum or average of grayscale values of the input image data IDAT corresponding to the pixels PX included in the block BL. In one or more embodiments, the block stress accumulator 211 may calculate the ages AG of the blocks BL by accumulating the stresses STR of the blocks BL for each frame period.

The block degradation calculator 212 may calculate block degradation amounts DA_BL of the blocks BL based on the ages AG of the blocks BL. The block degradation amount DA_BL may indicate a degree of degradation of the block BL. In one or more embodiments, the panel degradation amount DA_PN of the display panel 110 may be equal to a maximum block degradation amount among the block degradation amounts DA_BL of the blocks BL. In other words, the panel degradation amount DA_PN of the display panel 110 may be determined as the block degradation amount DA_BL of the block BL with the largest block degradation amount DA_BL among the blocks BL.

The maximum power current calculator 220 may calculate the maximum power current IDD_M of the display panel 110 based on the panel degradation amount DA_PN. As the driving time of the display panel 110 increases, the panel degradation amount DA_PN may increase, so that the maximum power current IDD_M of the display panel 110 may increase.

The reference current calculator 230 may calculate the reference current IREF by multiplying the maximum power current IDD_M by a gain GN. The reference current IREF may be a reference for determining whether the power current IDD of the display panel 110 is the overcurrent.

In one or more embodiments, as shown in FIG. 7, the gain GN may be constant regardless of the driving time of the display panel 110. For example, when the gain GN is 1.3 at the initial driving time of the display panel 110, the gain GN may be 1.3 regardless of the driving time of the display panel 110. In this case, the reference current IREF may be proportional to the maximum power current IDD_M.

In one or more embodiments, as shown in FIG. 8, the gain GN may decrease as the driving time of the display panel 110 increases. For example, when the gain GN is 1.3 at the initial driving time of the display panel, the gain GN may be less than 1.3 after the initial driving time of the display panel 110. When increasing the reference current IREF in consideration of the increase in power current IDD due to compensation for the degradation of the display panel 110, although frequent performance of the high power voltage ELVDD reduction operation is reduced or prevented, power consumption of the display device may increase because the high power voltage ELVDD reduction operation is not performed when the power current IDD is less than the reference current IREF although the power current IDD increases. As shown in FIG. 8, when the gain GN decreases as the driving time of the display panel 110 increases, excessive increase of the reference current IREF may be reduced or prevented, and accordingly, increase of the power consumption of the display device may be reduced or prevented.

In one or more embodiments, gain GN may be greater than 1. Although the gain GN decreases as the driving time of the display panel 110 increases, because the gain GN is greater than 1, the reference current IREF may not be less than the maximum power current IDD_M, and accordingly, excessive performance of the high power voltage ELVDD reduction operation may be reduced or prevented.

When the power current IDD is greater than the reference current IREF, the high power voltage controller 240 may determine that the power current IDD is the overcurrent, and may provide a high power voltage control signal ELVDD_CS for decreasing the high power voltage ELVDD to the power management circuit 140. The power management circuit 140 may perform the high power voltage ELVDD reduction operation to decrease the high power voltage ELVDD based on the high power voltage control signal ELVDD_CS.

The degradation compensator 250 may convert the input image data IDAT into the output image data ODAT based on the block degradation amounts DA_BL. In one or more embodiments, the degradation compensator 250 may calculate block compensation values for the blocks BL based on the block degradation amounts DA_BL, and may calculate the grayscale values of the output image data ODAT by adding the block compensation values to the grayscale values of the input image data IDAT. In one or more embodiments, the degradation compensator 250 may include a look-up table (LUT) in which the block compensation values corresponding to the block degradation amounts DA_BL are stored. Accordingly, the degradation of the pixels PX (or the degradation of the display panel 110) may be compensated.

Figure 9:
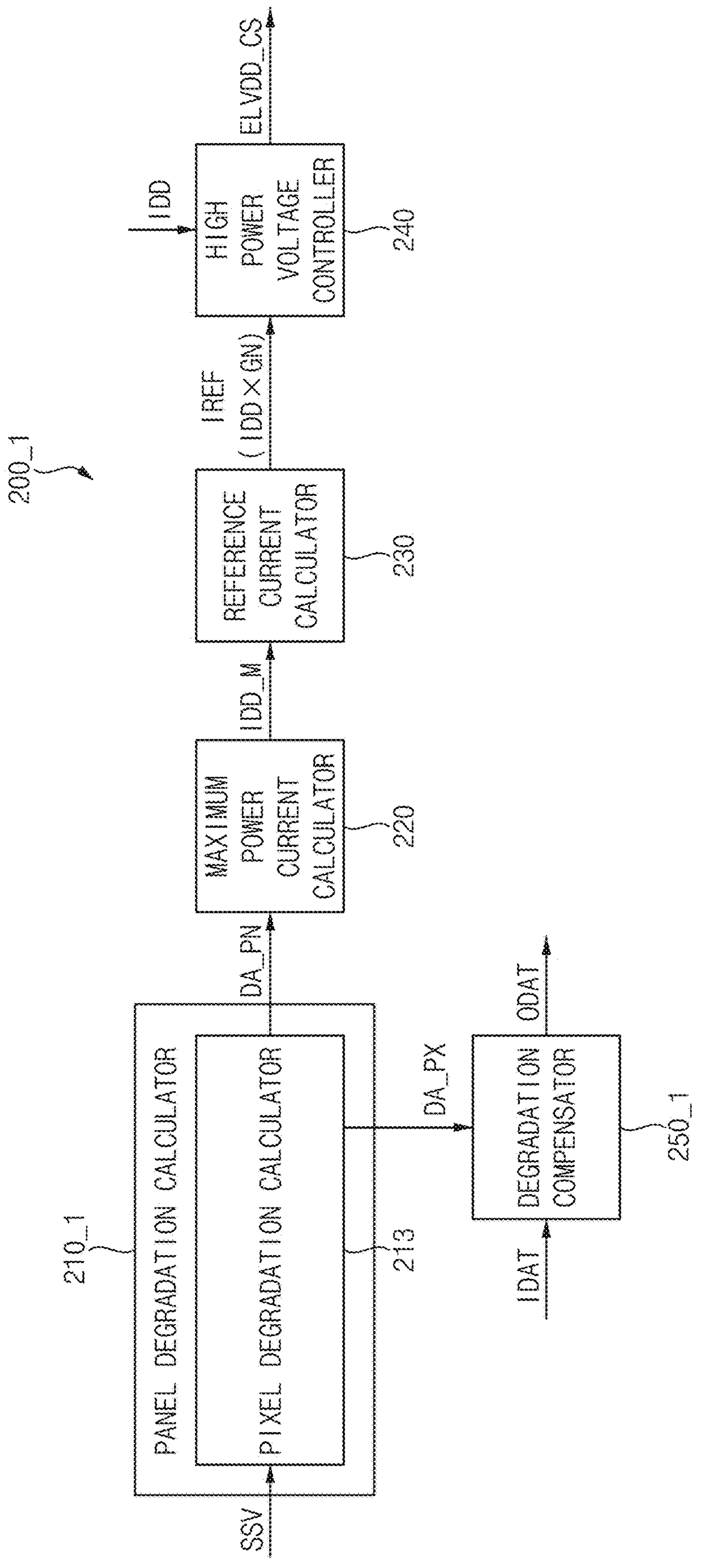
FIG. 9 is a block diagram showing an example of a controller included in the display device of FIG. 1.

FIG. 9 is a block diagram showing an example of a controller 200_1 included in the display device 100 of FIG. 1.

Referring to FIGS. 1 and 9, the controller 200_1 may include a panel degradation calculator 210_1, a maximum power current calculator 220, a reference current calculator 230, a high power voltage controller 240, and a degradation compensator 250_1. Descriptions of components of the controller 200_1 described with reference to FIG. 9, which are substantially the same as or similar to those of the controller 200 described with reference to FIG. 5, will be omitted.

In one or more embodiments, the panel degradation calculator 210_1 may include a pixel degradation calculator 213. The pixel degradation calculator 213 may calculate pixel degradation amounts DA_PX of the pixels PX based on the sensing values SSV for the pixels PX measured by the sensing circuit 150. The pixel degradation amount DA_PX may indicate a degree of a degradation of the pixel PX. In one or more embodiments, the panel degradation amount DA_PN of the display panel 110 may be equal to a maximum pixel degradation amount among the pixel degradation amounts DA_PX of the pixels PX. In other words, the panel degradation amount DA_PN of the display panel 110 may be determined as the pixel degradation amount DA_PX of the pixel PX with the largest pixel degradation amount DA_PX among the pixels PX.

The degradation compensator 250_1 may convert the input image data IDAT into the output image data ODAT based on the pixel degradation amounts DA_PX. In one or more embodiments, the degradation compensator 250_1 may calculate pixel compensation values for the pixels PX based on the pixel degradation amounts DA_PX, and may calculate the grayscale values of the output image data ODAT by adding the pixel compensation values to the grayscale values of the input image data IDAT. In one or more embodiments, the degradation compensator 250_1 may include a lookup table in which the pixel compensation values corresponding to the pixel degradation amounts DA_PX are stored. Accordingly, the degradation of the pixels PX (or the degradation of the display panel 110) may be compensated.

Figure 10:
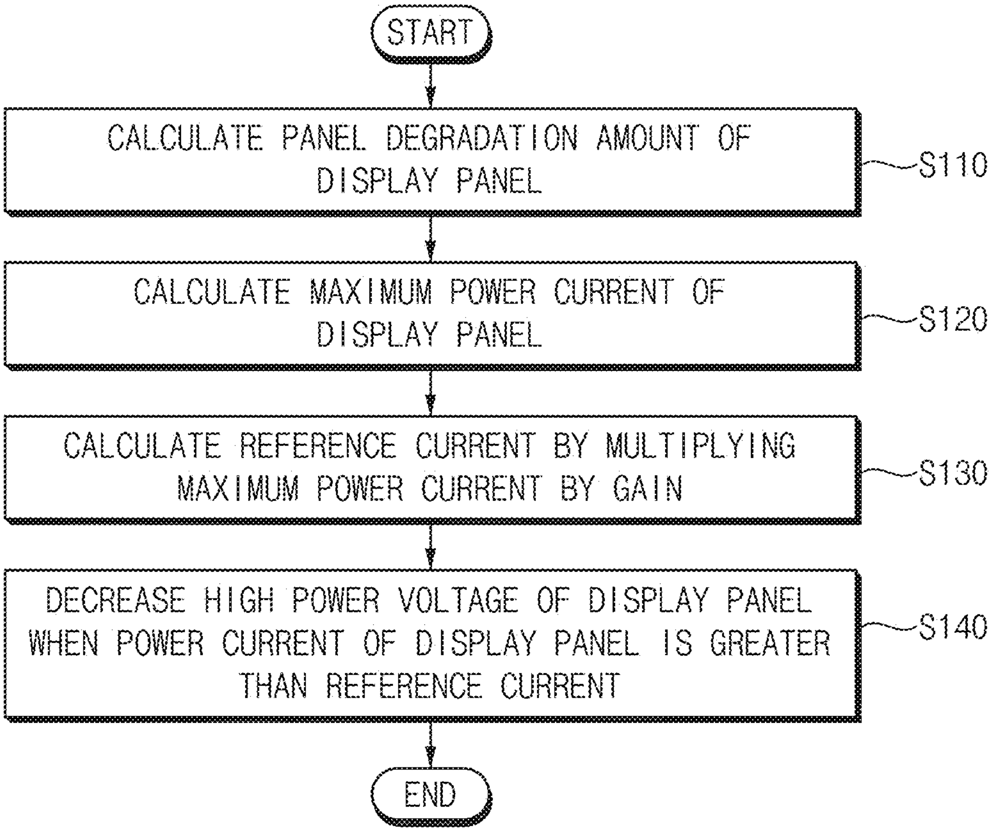
FIG. 10 is a flowchart showing a method of driving a display device according to one or more embodiments.
Figure 11:
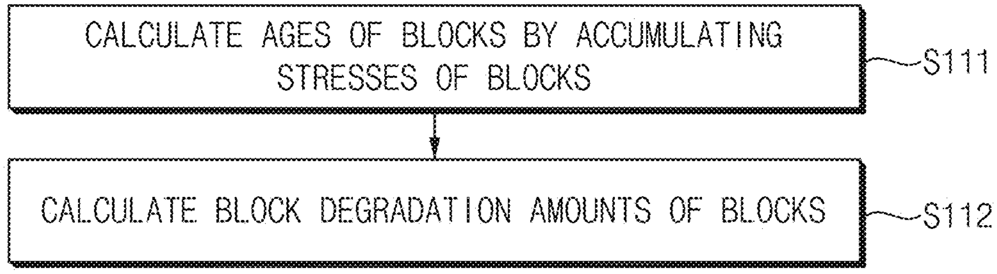
FIG. 11 is a flowchart showing an example of a calculation of a panel degradation amount included in the method of driving the display device in FIG. 10.
Figure 12:
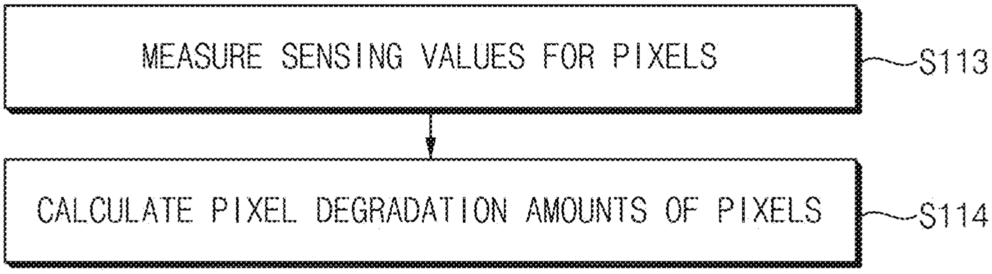
FIG. 12 is a flowchart showing an example of a calculation of a panel degradation amount included in the method of driving the display device in FIG. 10.

FIG. 10 is a flowchart showing a method of driving a display device 100 according to one or more embodiments. FIG. 11 is a flowchart showing an example of a calculation of the panel degradation amount DA_PN included in the method of driving the display device 100 in FIG. 10. FIG. 12 is a flowchart showing an example of a calculation of the panel degradation amount DA_PN included in the method of driving the display device 100 in FIG. 10.

Referring to FIGS. 1, 5, 9, and 10, a method of driving the display device 100 may include calculating the panel degradation amount DA_PN of the display panel 110 including the plurality of pixels PX (S110), calculating the maximum power current IDD_M of the display panel 110 based on the panel degradation amount DA_PN (S120), calculating the reference current IREF by multiplying the maximum power current IDD_M by the gain GN (S130), and decreasing the high power voltage ELVDD of the display panel 110 when the power current IDD of the display panel 110 is greater than the reference current IREF (S140).

In one or more embodiments, as shown in FIG. 11, the calculating of the panel degradation DA_PN (S110) may include calculating the ages of the blocks BL by accumulating the stresses STR of the blocks BL (S111) and calculating the block degradation amounts DA_BL of the blocks BL based on the ages AG of the blocks BL (S112). In one or more embodiments, the panel degradation amount DA_PN may be equal to the maximum block degradation amount among the block degradation amounts DA_BL.

In one or more embodiments, as shown in FIG. 12, the calculating of the panel degradation amount DA_PN (S110) may include measuring the sensing values SSV for the pixels PX (S113) and calculating the pixel degradation amounts DA_PX of the pixels PX based on the sensing values SSV (S114). In one or more embodiments, the panel degradation amount DA_PN may be equal to the maximum pixel degradation amount among the pixel degradation amounts DA_PX.

In one or more embodiments, as shown in FIG. 7, the gain GN may be constant regardless of the driving time of the display panel 110. In this case, the reference current IREF may be proportional to the maximum power current IDD_M.

In one or more embodiments, as shown in FIG. 8, the gain GN may decrease as the driving time of the display panel 110 increases. When the gain GN decreases as the driving time of the display panel 110 increases, excessive increase of the reference current IREF may be reduced or prevented, and accordingly, increase of the power consumption of the display device may be reduced or prevented.

In one or more embodiments, gain GN may be greater than 1. Although the gain GN decreases as the driving time of the display panel 110 increases, because the gain GN is greater than 1, the reference current IREF may not be less than the maximum power current IDD_M, and accordingly, excessive performance of the high power voltage ELVDD reduction operation may be reduced or prevented.

Figure 13:
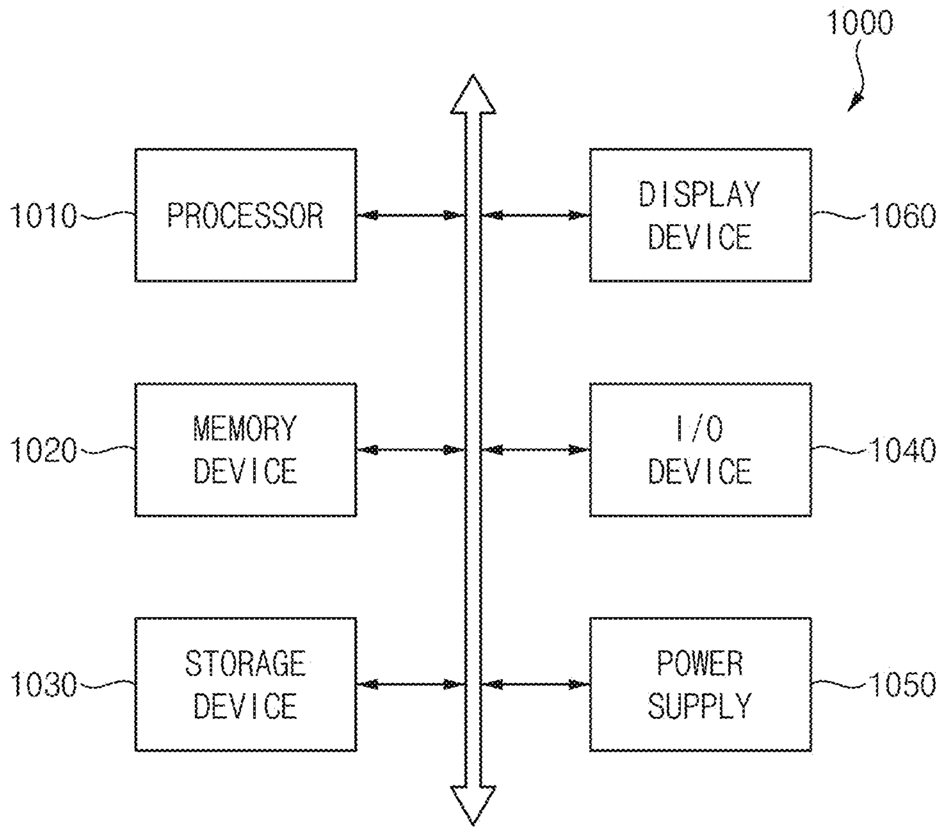
FIG. 13 is a block diagram showing an electronic apparatus according to one or more embodiments.
Figure 14:
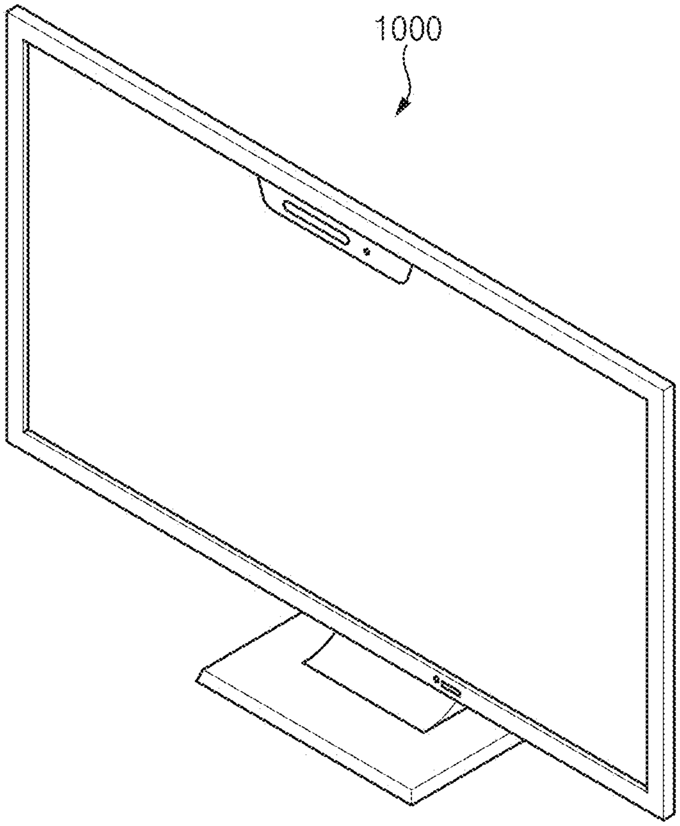
FIG. 14 is a view showing an example in which the electronic apparatus of FIG. 13 is implemented as a computer monitor.

FIG. 13 is a block diagram showing an electronic apparatus 1000 according to one or more embodiments. FIG. 14 is a view showing an example in which the electronic apparatus 1000 of FIG. 13 is implemented as a computer monitor.

Referring to FIG. 13, an electronic apparatus 1000 may include a processor 1010, a memory device 1020, a storage device 1030, an input/output (I/O) device 1040, a power supply 1050, and a display device 1060. The electronic apparatus 1000 may further include a plurality of ports capable of communicating with a video card, a sound card, a memory card, a USB device, and the like, or communicating with other systems.

In one or more embodiments, as shown in FIG. 14, the electronic apparatus 1000 may be implemented as a computer monitor. However, the present disclosure is not limited thereto, and according to one or more other embodiments, the electronic apparatus 1000 may be implemented as a television, a mobile phone, a video phone, a smart pad, a tablet PC, a vehicle navigation, a laptop computer, a head-mounted display, or the like.

The processor 1010 may perform specific calculations or tasks. According to one or more embodiments, the processor 1010 may be a microprocessor, a central processing unit (CPU), or the like. The processor 1010 may be connected to other components through an address bus, a control bus, a data bus, and the like. According to one or more embodiments, the processor 1010 may also be connected to an expansion bus, such as a peripheral component interconnect (PCI) bus. In one or more embodiments, the processor 1010 may provide the input image data (IDAT of FIG. 1) and the control signal (CTRL of FIG. 1) to the display device 1060.

The memory device 1020 may store data required for an operation of the electronic apparatus 1000. For example, the memory device 1020 may include: a nonvolatile memory device, such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM); and/or a volatile memory device, such as a dynamic random access memory (DRAM), a static random access memory (SRAM), or a mobile DRAM.

The storage device 1030 may include a solid state drive (SSD), a hard disk drive (HDD), a CD-ROM, and the like. The I/O device 1040 may include: an input device, such as a keyboard, a keypad, a touch pad, a touch screen, or a mouse; and an output device, such as a speaker or a printer. The power supply 1050 may supply a power required for the operation of the electronic apparatus 1000. The display device 1060 may be connected to other components through the buses or other communication links. The display device 1060 may correspond to the display device 100 of FIG. 1.

In the display device 1060, a reference current may be calculated by multiplying a maximum power current calculated based on a panel degradation amount of a display panel by a gain, and a high power voltage of the display panel may decrease when a power current of the display panel is greater than the reference current, so that the high power voltage may be controlled in consideration of a degradation compensation of the display panel, and frequent decrease of the high power voltage may be reduced or prevented. Further, the gain may decrease as a driving time of the display panel increases, so that increase of the power consumption of the display device 1060 may be reduced or prevented.

The display device according to the embodiments may be applied to a display device included in a computer, a notebook, a mobile phone, a smart phone, a smart pad, a smart watch, a PMP, a PDA, an MP3 player, or the like.

Although the display devices and the methods of driving the display devices according to the embodiments have been described with reference to the drawings, the illustrated embodiments are examples, and may be modified and changed by a person having ordinary knowledge in the relevant technical field without departing from the technical spirit described in the following claims, with functional equivalents thereof to be included therein.

What is claimed is:

1. A display device comprising:

a display panel comprising pixels;

a power management circuit configured to provide a voltage to the display panel through a power voltage line, and configured to decrease the voltage when a power current of the display panel flowing through the power voltage line is greater than a reference current; and a controller configured to control the power management circuit, and comprising:

a panel degradation calculator configured to calculate a panel degradation amount of the display panel;

a maximum power current calculator configured to calculate a maximum power current of the display panel based on the panel degradation amount; and a reference current calculator configured to calculate the reference current by multiplying the maximum power current by a gain.

2. The display device of claim 1, wherein the panel degradation calculator comprises:

a block stress accumulator configured to calculate ages of blocks comprising at least one pixel among the pixels by accumulating stresses of the blocks; and a block degradation calculator configured to calculate block degradation amounts of the blocks based on the ages of the blocks.

3. The display device of claim 2, wherein the panel degradation amount is equal to a maximum block degradation amount among the block degradation amounts.

4. The display device of claim 2, wherein the controller further comprises a degradation compensator configured to convert input image data into output image data based on the block degradation amounts.

5. The display device of claim 1, further comprising a sensing circuit configured to measure sensing values for the pixels, wherein the panel degradation calculator comprises a pixel degradation calculator configured to calculate pixel degradation amounts of the pixels based on the sensing values.

6. The display device of claim 5, wherein the panel degradation amount is equal to a maximum pixel degradation amount among the pixel degradation amounts.

7. The display device of claim 5, wherein the controller further comprises a degradation compensator which configured to convert input image data into output image data based on the pixel degradation amounts.

8. The display device of claim 1, wherein the gain is configured to remain constant regardless of a driving time of the display panel.

9. The display device of claim 1, wherein the gain is configured to decrease as a driving time of the display panel increases.

10. The display device of claim 9, wherein the gain is greater than 1.

11. The display device of claim 1, wherein the power current is a sum of driving currents flowing through light-emitting elements of the pixels.

12. The display device of claim 1, wherein the maximum power current corresponds to a maximum luminance of an image displayed by the display panel.

13. A method of driving a display device, the method comprising:

calculating a panel degradation amount of a display panel comprising pixels;

calculating a maximum power current of the display panel based on the panel degradation amount;

calculating a reference current by multiplying the maximum power current by a gain; and decreasing a voltage of the display panel when a power current of the display panel is greater than the reference current.

14. The method of claim 13, wherein calculating the panel degradation amount comprises:

calculating ages of blocks each comprising at least one pixel among the pixels by accumulating stresses of the blocks; and calculating block degradation amounts of the blocks based on the ages of the blocks.

15. The method of claim 14, wherein the panel degradation amount is equal to a maximum block degradation amount among the block degradation amounts.

16. The method of claim 13, wherein calculating the panel degradation amount comprises:

measuring sensing values for the pixels; and calculating pixel degradation amounts of the pixels based on the sensing values.

17. The method of claim 16, wherein the panel degradation amount is equal to a maximum pixel degradation amount among the pixel degradation amounts.

18. The method of claim 13, further comprising maintaining the gain as constant regardless of a driving time of the display panel.

19. The method of claim 13, further comprising decreasing the gain as a driving time of the display panel increases.

20. The method of claim 19, wherein the gain is greater than 1.

* * * * *